(12) United States Patent
Goodall et al.

(10) Patent No.: US 6,303,724 B1
(45) Date of Patent: Oct. 16, 2001

(54) POLYCYCLIC COPOLYMER COMPOSITIONS

(75) Inventors: Brian Leslie Goodall, Baton Rouge, LA (US); Lester Howard McIntosh, III, Cuyahoga Falls, OH (US)

(73) Assignee: The B. F. Goodrich Company, Brecksville, OH (US)

(*) Notice: Subject to any disclaimer, the term of this patent is extended or adjusted under 35 U.S.C. 154(b) by 0 days.

(21) Appl. No.: 09/345,286

(22) Filed: Jun. 30, 1999

Related U.S. Application Data (60) Provisional application No. 60/091,361, filed on Jul. 1, 1998.

(51) Int. Cl.$^7$ .................................................. C08F 24/00
(52) U.S. Cl. ..................... 526/266; 526/281; 526/882; 526/283; 526/268; 526/332; 526/120; 526/133; 526/169.1; 526/171
(58) Field of Search ................................. 526/281, 282, 526/283, 268, 332, 120, 133, 169.1, 171, 266

(56) References Cited

U.S. PATENT DOCUMENTS

| | | |
|---|---|---|
| 3,313,785 | 4/1967 | Zutty . |
| 3,536,681 | 10/1970 | Morris . |
| 3,697,490 | 10/1972 | Starmer . |
| 5,053,471 * | 10/1991 | Goto et al. ........................ 526/281 |
| 5,399,647 | 3/1995 | Nozaki . |
| 5,468,819 | 11/1995 | Goodall et al. . |
| 5,585,222 | 12/1996 | Kaimoto et al. . |
| 5,677,405 * | 10/1997 | Goodall et al. ........................ 526/281 |
| 5,705,503 | 1/1998 | Goodall et al. . |
| 5,843,624 | 12/1998 | Houlihan et al. . |

FOREIGN PATENT DOCUMENTS

| | | |
|---|---|---|
| 0794458 | 9/1997 | (EP) . |
| 0836119 | 5/1998 | (EP) . |
| 0878738 | 11/1998 | (EP) . |
| 1427159 | 10/1973 | (GB) . |
| 2320718 | 7/1998 | (GB) . |
| 04063810 | 2/1992 | (JP) . |
| 9623010 | 8/1996 | (WO) . |

OTHER PUBLICATIONS

Mechanistic Studies of the Palladium–Catalyzed Copolymerization of Ethylene and α–Olefins with Methyl Acrylate, Brookhart et al., *J. Am. Chem. Soc.* 1998,120, 888–899.

Polymerization of Norbornene by Palladium(II) Complexes Bearing Ethylene–Bridged Bisindolinyl-or bis(1,2,3,4-tetrahydroquinolinyl) ligands, Abu–Surrah et al., *Journal of Molecular Catalysis A: Chemical* 128 (1998) 239–243.

Alternating Copolymers: Maleic Anhydride with Cyclic Olefins. Influence of the Cyclic Olefin on the Copolymerization Process and Properties of the Copolymers, Cincu et al., *Macromolecular Reports*, A33 (Suppl. 2), 83–91 (1996).

Polymer Chemistry, Bruno Vollmert, Translated from German by Edmund H. Immergut, Springer–Verlag (1973).*

* cited by examiner

*Primary Examiner*—David W. Wu
*Assistant Examiner*—William Cheung
(74) *Attorney, Agent, or Firm*—Thoburn T. Dunlap; Hudak & Shunk Co., L.P.A.

(57) ABSTRACT

Copolymers containing repeating units polymerized from at least one polycyclic monomer and at least one acrylic monomer are disclosed. The copolymer is formed by addition polymerization in the presence of a Group VIII transition metal catalyst. The copolymers contain hydrocarbyl and/or functional substituents pendant from the polymer backbone. In one embodiment the copolymer contains pendant ester substituents containing acid labile groups. The copolymers are useful as resist materials that are sensitive to imaging radiation.

8 Claims, 3 Drawing Sheets

POLYCYCLIC COPOLYMER COMPOSITIONS

This application claims benefit to Provisional No. 60/091,361 filed Jul. 1, 1998.

BACKGROUND OF THE INVENTION

1. Technical Field

The present invention relates to polycyclic copolymer compositions and methods for their preparation and use. More specifically this invention concerns random copolymers comprising repeating units polymerized from cycloolefinic and acrylate monomers.

2. Background

High molecular weight polycyclic addition polymers having directly linked polycyclic repeating units without any internal backbone unsaturation are desirous from the standpoint of their inherent thermoxidative stability and high glass transition temperature (Tg) profiles. Cycloolefinic monomers such as norbornene(bicyclo[2.2.1]hept-2-ene) have been addition polymerized utilizing a variety of catalytic systems. Goodall et al. (U.S. Pat. No. 5,468,819) have successfully prepared polycyclic polymers from cycloolefinic monomers such as norbornene and hydrocarbyl substituted norbornene-type monomers. The molecular weights and Tg's of these polymers are tailored to desired specifications by conducting the polymerization in the presence of a Group VIII transition metal catalyst and an olefinic chain transfer agent.

Recent objectives in polymer synthesis have focused on the polymerization of monomers containing functional groups to obtain polymers with high Tg's and molecular weights. The incorporation of functional substituents into hydrocarbon polymer backbones is useful for modifying the chemical and other physical properties of a polymer. U.S. Pat. No. 5,705,503 to Goodall and Risse discloses polycyclic addition polymers containing functional substituents. Goodall and Risse have demonstrated that cycloolefinic monomers containing pendant polar functionality could be polymerized to polymer compositions of high molecular weight and Tg.

An alternative method for the incorporation of polar functional groups into a hydrocarbon polymer backbone has been to copolymerize the hydrocarbon monomer (e.g. an olefin) with a polar functional comonomer (e.g., an acrylate). The random copolymerization of ethylene with methyl acrylate is to date only possible using free radical initiators under extreme conditions of temperature and pressure. Very recently some progress has been made in the area of coordination copolymerization of ethylene and methyl acrylate using palladium catalysts (Brookhart et al., J. Amer. Chem. Soc., 1998, 120, 888–899 and International Published Application WO 96/23010). In this case, however, the resulting copolymers are not true random copolymers since the majority, if not all, of the acrylate repeating units are incorporated at the chain ends of the highly branched polymer products.

In the case of copolymerizing a polycycloolefin with acrylic monomers the use of coordination catalysts for the copolymerization has never been described in the art. Indeed, International Application WO 96/23010 supra discloses that when a norbornene-type monomer is polymerized, no other monomer can be present. Even more recently, Abu-Surrah and Reiger (J. Mol. Catal. A: Chem. (1998), 128, 239–243) reported that certain cationic palladium (II) compounds active in the homopolymerization of norbornene are inactive to the homopolymerization and copolymerization of polar monomers like acrylates. They further reported that addition of methacrylate to norbornene polymerization systems using the disclosed catalysts resulted simply in higher molecular weight and narrower polydispersity of the norbornene homopolymers with no evidence for acrylate incorporation into the polymer backbone.

U.S. Pat. No. 3,536,681 to Morris discloses copolymers of norbornenes and acrylates that were polymerized by free radical means. The resulting polymers were elastomers with very low levels of norbornene incorporation (i.e., up to 5.5 weight percent).

U.S. Pat. No. 3,679,490 to Starmer discloses terpolymers of substituted norbornenes, acrylates and alkoxy alkyl acrylates. These polymers are again elastomeric (having subzero Tg's) and contain very low levels of norbornene (i.e., up to 5.5 weight percent).

More recently Behrens in German Published Patent Application 2,358,112 disclosed copolymers of acrylates with ethylidenenorbornene.

In U.S. Pat. No. 5,585,222 to Kaimoto et al. there is disclosed copolymers suitable for use in photoresist compositions. The disclosed copolymers are prepared by copolymerizing a 2-substituted norbornene with an acrylic acid ester in the presence of an anionic catalyst system. The substituent on the 2-position of the norbornene monomer is essential to the polymerization reaction. The substituent is selected from a chloro or cyano group which serves to activate the unsaturation on the norbornene ring to anionic polymerization.

In Japanese Patent Application Publication 04063810 to Kubo there is disclosed terpolymers polymerized from norbornene, maleic anhydride, and acrylic monomers.

In European Published Patent Application 0 794 458 there is described energy sensitive resist materials made by free radically polymerizing an alicyclic monomer such as norbornene and a second monomer such as maleic anhydride. Acrylic monomers can be incorporated as a third or fourth repeating unit in the polymer. The key to the successful free radical polymerization of these mixtures is that the norbornene monomer is an electron donor and the second monomer (maleic anhydride being preferred) is an electron acceptor. Such systems are known to be facile in free radical polymerization to afford alternating copolymers as reported by Cincu et al., Macromol. Reports, A33 (suppl. 2), 83–91 (1996).

In view of the limitations of the prior art, there is a need for random copolymers containing repeating units polymerized from polycycloolefin and acrylate comonomers that contain high levels of polycycloolefin incorporation and have high glass transition temperatures, without the need for special monomer activating substituents or the inclusion of special monomers in the reaction medium.

SUMMARY OF THE INVENTION

Accordingly, it is a general object of the invention to provide random copolymer compositions having repeating units polymerized from polycycloolefin and acrylic monomers. These copolymer compositions have a high Tg as well as a high level of polycyclic repeating unit incorporation.

It is another object of the invention to provide polycyclic/acrylate copolymer compositions that are devoid of maleic anhydride repeating units.

It is a further object of the invention to provide a catalyst system that is capable of copolymerizing polycycloolefin and acrylate monomers to high molecular weights and conversion.

It is another object of the invention to provide copolymers with varying degrees of polycyclic and acrylic repeating unit incorporation.

It is another object of the invention to provide polycyclic/acrylic copolymers with pendant functional groups.

It is a further object of the invention to provide polycyclic/acrylate copolymers containing pendant acid labile groups.

It is still a further object of the invention to provide polycyclic/acrylate copolymers useful in photoresist compositions.

These and other objects of the invention are accomplished by polymerizing a reaction mixture comprising at least one polycycloolefin or norbornene-type monomer, at least one acrylate monomer, and a solvent and a catalyst system comprising a Group VIII transition metal ion source.

DETAILED DESCRIPTION

The polycyclic copolymers of the present invention comprise repeating units copolymerized from at least one polycycloolefin monomer and at least one acrylate or methacrylate monomer. As used here and throughout the specification the term polycycloolefin means a norbornene-type monomer. The term norbornene-type monomer is meant to include norbornene, substituted norbornene(s), and any higher cyclic derivatives thereof so long as the monomer contains at least one norbornene or substituted norbornene moiety. The substituted norbornenes and higher cyclic derivatives thereof contain a pendant hydrocarbyl substituent(s) or a functional substituent(s) containing an oxygen atom.

For brevity, these monomers are collectively referred to herein as norbornene-type monomers and are represented by the structural formula below:

I wherein $R^1$ to $R^4$ independently represents a hydrocarbyl or functional substituent and m is an integer from 0 to 5.

When the substituent is a hydrocarbyl group $R^1$ to $R^4$ independently represent hydrogen, linear and branched ($C_1$–$C_{10}$) alkyl, linear and branched, ($C_2$–$C_{10}$) alkenyl, linear and branched ($C_2$–$C_{10}$) alkynyl, ($C_5$–$C_{12}$) cycloalkyl, ($C_6$–$C_{12}$) aryl, and ($C_7$–$C_{24}$) aralkyl. $R_1$ and $R_4$ together with the two ring carbon atoms to which they are attached can represent a saturated or unsaturated cyclic group containing 4 to 12 carbon atoms or an aryl group containing 6 to 14 carbon atoms. Representative alkyl groups include but are not limited to methyl, ethyl, propyl, isopropyl, butyl, isobutyl, sec-butyl, tert-butyl, pentyl, neopentyl, hexyl, heptyl, octyl, nonyl, and decyl. Representative alkenyl groups include but are not limited to vinyl, and allyl. Representative alkynyl groups include but are not limited to ethynyl, 1-propynyl, 2-propynyl, 1-butynyl, and 2-butynyl.

Representative cycloalkyl groups include but are not limited to cyclopentyl, cyclohexyl, and cyclooctyl substituents. Representative aryl groups include but are not limited to phenyl, naphthyl, and anthracenyl. Representative aralkyl groups include but are not limited to benzyl, and phenethyl. The term hydrocarbyl as used throughout the present specification is inclusive of halohydrocarbyl substituents. By halohydrocarbyl is meant that at least one hydrogen atom on the alkyl, alkenyl, alkynyl, cycloalkyl, aryl, and aralkyl groups is replaced with a halogen atom selected from chlorine, bromine, fluorine and iodine. The degree of halogenation can range from at least one hydrogen atom being replaced by a halogen atom (e.g., a fluoromethyl group) to fill halogenation (perhalogenation) wherein all hydrogen atoms on the hydrocarbyl group have been replaced by a halogen atom (e.g., trifluoromethyl or perfluoromethyl). The preferred perhalohydrocarbyl groups include perhalogenated phenyl and alkyl groups. The halogenated alkyl groups usefull in the invention are linear or branched and have the formula $C_zX_{2z+1}$ wherein X is a halogen as set forth above and z is selected from an integer of 1 to 10. Preferably X is fluorine. Preferred perfluorinated substituents include perfluorophenyl, perfluoromethyl, perfluoroethyl, perfluoropropyl, and perfluorobutyl. In addition to the halogen substituents, the cycloalkyl, aryl, and aralkyl groups of the invention can be further substituted with linear and branched ($C_1$–$C_5$) alkyl and haloalkyl groups, aryl groups and cycloalkyl groups.

When the pendant group(s) is a functional substituent, $R^1$ to $R^4$ independently represent a radical selected from —$(CH_2)_nC(O)OR^5$, —$(CH_2)_n$—$C(O)OR^5$, —$(CH_2)_n$—$OR^5$, —$(CH_2)_n$—$OC(O)R^5$, —$(CH_2)_n$—$C(O)R^5$, —$(CH_2)_n$—$OC(O)OR^5$, and —$(CH_2)_nC(O)OR^6$, wherein n independently represents an integer from 0 to 10 and $R^5$ independently represents hydrogen, linear and branched ($C_1$–$C_{10}$) alkyl, linear and branched, ($C_2$–$C_{10}$) alkenyl, linear and branched ($C_2$–$C_{10}$) alkynyl, ($C_5$–$C_{12}$) cycloalkyl, ($C_6$–$C_{14}$) aryl, and ($C_7$–$C_{24}$) aralkyl. Representative hydrocarbyl groups set forth under the definition of $R^5$ are the same as those identified above under the definition of $R^1$ to $R^4$. As set forth above under $R^1$ to $R^4$ the hydrocarbyl groups defined under $R^5$ can be halogenated and perhalogenated. The $R^6$ radical represents an acid labile moiety selected from —$C(CH_3)_3$, —$Si(CH_3)_3$, —$CH(R^7)OCH_2CH_3$, —$CH(R^7)OC(CH_3)_3$ or the following cyclic groups:

wherein $R^7$ represents hydrogen or a linear or branched ($C_1$–$C_5$) alkyl group. The alkyl groups include methyl, ethyl, propyl, i-propyl, butyl, i-butyl, t-butyl, pentyl, t-pentyl and neopentyl. In the above structures, the single bond line projecting from the cyclic groups indicates the position where the cyclic protecting group is bonded to the acid substituent. Examples of $R^6$ radicals include 1-methyl-1-cyclohexyl, isobornyl, 2-methyl-2-isobornyl, 2-methyl-2-adamantyl, tetrahydrofuranyl, tetrahydropyranoyl, 3-oxocyclohexanonyl, mevalonic lactonyl, 1-ethoxyethyl, and 1-butoxy ethyl.

The $R^6$ radical can also represent dicyclopropylmethyl (Dcpm), and dimethylcyclopropylmethyl (Dmcp) groups which are represented by the following structures:

In Formula I above m is preferably 0 or 1, more preferably m is 0. When m is 0 the preferred norbornene-type monomer structure is represented below:

Ia wherein $R^1$ to $R^4$ are as previously defined under Formula I above.

The acrylate and methacrylate comonomers of this invention are represented by the formula $CH_2=CHR^8C(O)OR^9$, wherein $R^8$ is hydrogen or methyl and $R^9$ is selected from hydrogen, linear and branched $(C_1-C_{10})$ alkyl, linear and branched, $(C_2-C_{10})$ alkenyl, linear and branched $(C_2-C_{10})$ alkynyl, $(C_5-C_{12})$ cycloalkyl, $(C_6-C_{14})$ aryl, and $(C_7-C_{24})$ aralkyl. Representative alkyl groups include but are not limited to methyl, ethyl, propyl, isopropyl, butyl, isobutyl, sec-butyl, tert-butyl, pentyl, neopentyl, hexyl, heptyl, octyl, nonyl, and decyl. Representative alkenyl groups include but are not limited to vinyl, and allyl. Representative alkynyl groups include ethynyl, 1-propynyl, 2-propynyl, 1-butynyl, and 2-butynyl. Representative cycloalkyl groups include but are not limited to cyclopentyl, cyclohexyl, and cyclooctyl substituents. Representative aryl groups include but are not limited to phenyl, naphthyl and anthracenyl. Representative aralkyl groups include but are not limited to benzyl, and phenethyl. As discussed above, the hydrocarbyl groups include halogenated and perhalogenated hydrocarbyl substituents. The preferred perhalohydrocarbyl groups include perhalogenated phenyl and alkyl groups. The alkyl groups are linear or branched and have the formula $C_zX_{2z+1}$ wherein X is a halogen and z is selected from an integer from 1 to 10. Preferably X is fluorine. Preferred perfluorinated substituents include perfluorophenyl, perfluoromethyl, perfluoroethyl, perfluoropropyl, and perfluorobutyl. In addition to the halogen substituents, the cycloalkyl and aryl groups of the invention can be further substituted with linear and branched $(C_1-C_5)$ alkyl and haloalkyl groups, aryl groups and cycloalkyl groups.

In the acrylate and methacrylate formulae above $R^9$ also represents an acid labile moiety selected from $-C(CH_3)_3$, $-Si(CH_3)_3$, $-CH(R^7)OCH_2CH_3$, $-CH(R^7)OC(CH_3)_3$ or the following cyclic groups:

wherein $R^7$ is the same as defined above. Representative groups defined under $R^9$ include 1-methyl-1-cyclohexyl, isobornyl, 2-methyl-2-isobornyl, 2-methyl-2-adamantyl, tetrahydrofuranyl, tetrahydropyranoyl, 3-oxocyclohexanonyl, mevalonic lactonyl, 1-ethoxyethyl, and 1-t-butoxy ethyl groups. $R^9$ can also represent the Dcpm and Dmcp groups defined above.

One or more of the norbornene-type monomers described under Formula I is copolymerized with one or more of the acrylate and/or methacrylate monomers described above to yield random copolymers containing repeating units of the formula:

wherein $R^1$ to $R^4$, $R^8$ and $R^9$ are as previously defined.

The copolymers of the invention contain polycyclic repeating units which are the same or different and acrylic repeating units which are the same or different. In other words, the substituents on the respective polycyclic and acrylic repeating units do not have to be the same. The copolymers of the invention comprise from about 95 to about 5 mole percent of polycyclic repeating units and about 5 to about 95 mole percent of acrylic repeating units. Preferably, the copolymers contain from about 90 to about 10 mole percent of polycyclic repeating units to about 10 to about 90 mole percent of acrylic repeating units. More preferably, the copolymers contain from about 80 to about 20 mole percent of polycyclic repeating units and from about 20 to about 80 mole percent of acrylic repeating units.

The copolymers of the invention preferably have a Tg of greater than about 50° C. More preferably the copolymers of the invention exhibit a Tg in the range of about 51° C. to 200° C., and still more preferably in the range of about 100° C. to 150° C.

In one embodiment of the invention, at least one of the polycyclic and/or acrylic repeating units in the polycyclic/acrylic copolymer contains an ester functionality bearing an acid labile group. By acid labile is meant that the ester function (i.e., ester of a carboxylic acid) contains a protecting or leaving group. The protecting group is capable of being cleaved in the presence of an acid, producing a free carboxylic acid and an acidolysis or acid catalyzed hydrolysis byproduct. In this way the hydrophilicity or solubility of the copolymer can be regulated by the amount of ester functionality that is converted to free carboxylic acid groups.

The acid labile group is polymerized into the copolymer backbone through one or more of the polycyclic repeating units, one or more of the acrylic repeating units or through one or more of both the polycyclic and acrylic repeating units. The repeating unit structures of such acid labile group containing copolymers are represented as follows:

wherein $R^1$ to $R^4$, $R^6$, $R^9$, m and n are as previously defined, and at least one of $R^6$ and/or $R^9$ must be an acid labile group selected from $—C(CH_3)_3$, $—Si(CH_3)_3$, $—CH(R^7)OCH_2CH_3$, $—CH(R^7)OC(CH_3)_3$ of the following cyclic groups:

wherein $R^7$ is the same as previously defined, and x, y, and z represent the amount in mole percent of each repeating unit contained in the copolymer, wherein x+y is present in the amount of about 95 to about 5 mole percent of the copolymer composition, z is present from about 5 to about 95 mole percent, x or y can be 0 with the proviso that x and y can not be 0 at the same time, when y is 0 at least a portion of $R^9$ must be an acid labile group, and x+y+z=100 mole percent of the copolymer composition. Preferably, the amount of repeating units present in the copolymer backbone that contain the pendant acid labile group functionality, is sufficient to confer a solubility change (insoluble to soluble) of the copolymer in aqueous media (e.g., an aqueous base) following the cleavage of the acid labile group from the protected ester functionality. Preferably, the amount of repeating units in the copolymer containing the acid labile groups ranges from about 10 to about 50 mole percent, more preferably from about 15 to about 35 mole percent, and still more preferably from about 20 to about 30 mole percent.

Representative acid labile groups defined under $R^6$ and $R^9$ include 1-methyl-1-cyclohexyl, isobornyl, 2-methyl-2-isobornyl, 2-methyl-2-adamantyl, tetrahydrofuranyl, tetrahydropyranoyl, 3-oxocyclohexanonyl, mevalonic lactonyl, 1-ethoxyethyl, and 1-t-butoxy ethyl groups. $R^6$ and $R^9$ can also represent the Dcpm and Dmcp groups defined above.

Catalyst Systems

In one embodiment, the comonomers of the invention are polymerized by a single component catalyst system comprising a Group VIII metal cation complex and a weakly coordinating counteranion as represented by the following formula:

$$[L_{y'}M X'_{z'}] \quad [CA]_a$$
cation complex     counteranion wherein L represents a ligand containing 1, 2, or 3 π-bonds; M represents a Group VIII transition metal; X' represents a ligand containing 1 σ-bond and between 0 to 3 π-bonds; y' is 0, 1, or 2, preferably 1; z' is 1. CA represents a weakly coordinating counteranion; and a is a number representing the number of times the counteranion is taken to balance the charge on the cation complex. In the above formula y', z', and a are preferably 1.

The phrase "weakly coordinating counteranion" refers to an anion which is only weakly coordinated to the cation, thereby remaining sufficiently labile to be displaced by a neutral Lewis base. More specifically, the phrase refers to an anion which when functioning as a stabilizing anion in the catalyst system of this invention does not transfer an anionic substituent or fragment thereof to the cation, thereby forming a neutral product. The counteranion is non-oxidative, non-reducing, non-nucleophilic, and relatively inert.

L is a neutral ligand that is weakly coordinated to the Group VIII metal cation complex. In other words, the ligand is relatively inert and is readily displaced from the metal cation complex by the inserting monomer in the growing polymer chain. Suitable π-bond containing ligands include ($C_2$–$C_{12}$) monoolefins (e.g., 2,3-dimethyl-2-butene), ($C_4$–$C_{12}$) diolefins (e.g., norbornadiene) and ($C_6$–$C_{20}$) aromatic moieties. Preferably ligand L is a chelating bidentate cyclo($C_6$–$C_{12}$) diolefin, for example, cyclooctadiene (COD) or dibenzo COD, or an aromatic compound such as benzene, toluene, or mesitylene.

The Group VIII metal M is selected from Group VIII metals of the Periodic Table of the Elements. Preferably M is selected from nickel and palladium. The most preferred metal is palladium.

Ligand X' is selected from (i) a moiety that provides a single metal-carbon σ-bond (no π bonds) to the metal in the cation complex or (ii) a moiety that provides a single metal carbon σ-bond and 1 to 3 π-bonds to the metal in the cation complex. Under embodiment (i) the moiety is bound to the Group VIII metal by a single metal-carbon a-bond and no π-bonds. Representative ligands defined under this embodiment include ($C_1$–$C_{10}$) alkyl moieties selected from methyl, ethyl, linear and branched moieties such as propyl, isopropyl, butyl, isobutyl, sec-butyl, tert-butyl, pentyl, neopentyl, hexyl, heptyl, octyl, nonyl, and decyl; aryl such as phenyl, p-tolyl, or pentaflurophenyl and ($C_7$–$C_{15}$) aralkyl such as benzyl. Under embodiment (ii) generally defined above, the cation has a hydrocarbyl group directly bound to the metal by a single metal-carbon σ-bond, and also by at least one, but no more than three π-bonds. By hydrocarbyl is meant a group that is capable of stabilizing the Group VIII metal cation complex by providing a carbon-metal σ-bond and one to three olefinic π-bonds that may be conjugated or non-conjugated. Representative hydrocarbyl groups are ($C_3$–$C_{20}$) alkenyl which may be non-cyclic, monocyclic, or polycyclic and can be substituted with linear and branched ($C_1$–$C_{20}$) alkoxy, ($C_6$–$C_{15}$) aryloxy or halo groups (e.g., Cl and F).

Preferably X' is a single allyl ligand, or, a canonical form thereof, which provides a σ-bond and a π-bond; or a compound providing at least one olefinic π-bond to the metal, and a σ-bond to the metal from a distal carbon atom, spaced apart from either olefinic carbon atom by at least two carbon-carbon single bonds (embodiment iii).

It should be readily apparent to those skilled in the art that when ligand L is absent (i.e., y' is zero), the metal cation complex will be weakly ligated by the solvent in which the reaction was carried out. Representative solvents include but are not limited to halogenated hydrocarbons such as carbon tetrachloride, chloroform, dichloromethane, 1,2-dichloroethane, diethyl ether, THF, and aromatic solvents such as benzene, toluene, mesitylene, chlorobenzene, and nitrobenzene, and the like. A more detailed discussion of appropriate solvents will follow.

Selected embodiments of the Group VIII metal cation complexes of the single component catalyst systems of this invention are shown below.

Structure II illustrates embodiment (i) wherein ligand X' is a methyl group that is bound to the metal via a single metal-carbon σ-bond, and ligand L is COD that is weakly coordinated to the palladium metal via two olefinic π-bonds. In the structure below M preferably represents palladium or nickel.

II

Structures III, IV, and V illustrate various examples of embodiment (ii) wherein X' is an allyl group that is bound to the metal (palladium is shown for illustrative purposes only) via a single metal-carbon σ-bond and at least one but no more than three π-bonds.

In Structure III, L is not present but an aromatic group providing three π-bonds is weakly coordinated to the palladium metal; X' is an allyl group providing a single metal-carbon σ-bond and an olefinic π-bond to the palladium.

In Structure IV, L is COD and X' is an allyl group providing a metal-carbon σ-bond and an olefinic π-bond to the palladium.

Structure V illustrates an embodiment wherein ligand X' is an unsaturated hydrocarbon group that provides a metal-carbon σ-bond, a conjugated π-bond and two additional π-bonds to the palladium; L is absent.

III

IV

V

Substituents $R^{20}$, $R^{21}$, $R^{22}$ are described in detail below.

Structures VI and VII illustrate examples of embodiment (iii) wherein L is COD and X is a ligand that provides at least one olefinic π-bond to the Group VIII metal and a σ-bond to the metal from a distal carbon atom, spaced apart from either olefinic carbon atom by at least two carbon-carbon single bonds.

VI

VII

The above described Group VIII cation complexes are associated with a weakly coordinating or non-coordinating counteranion, CA⁻, which is relatively inert, a poor nucleophile and provides the cation complex with essential solubility in the reaction solvent. The key to proper anion design requires that it be labile, stable, and inert toward reactions with the cationic Group VIII metal complex in the final catalyst species, and that it renders the single component catalyst soluble in the solvents of this invention. The anions which are stable toward reactions with water or Brønsted acids, and which do not have acidic protons located on the exterior of the anion (i.e., anionic complexes which do not react with strong acids or bases) possess the stability necessary to qualify as a stable anion for the catalyst system. The properties of the anion which are important for maximum lability include overall size, and shape (i.e., large radius of curvature), and nucleophilicity.

In general, a suitable anion may be any stable anion which allows the catalyst to be dissolved in a solvent of choice, and has the following attributes: (1)the anion should form stable salts with the aforementioned Lewis acid, Brønsted acids, reducible Lewis Acids, protonated Lewis bases, thallium and silver cations; (2) the negative charge on the anion should be delocalized over the framework of the anion or be localized within the core of the anion; (3) the anion should be a relatively poor nucleophile; and (4) the anion should not be a powerfull reducing or oxidizing agent.

Anions that meet the foregoing criteria can be selected from the group consisting of a tetrafluoride of Ga, Al, or B; a hexafluoride of P, Sb, or As; perfluoro-acetates, propionates and butyrates, hydrated perchlorate; toluene sulfonates, and trifluoromethyl sulfonate; and substituted tetraphenyl borate wherein the phenyl ring is substituted with fluorine or trifluoromethyl moieties. Selected examples of counteranions include $BF_4^-$, $PF_6^-$, $AlF_3O_3SCF_3^-$, $SbF_6^-$, $SbF_5SO_3F^-$; $AsF_6^-$, trifluoroacetate ($CF_3CO_2^-$), pentafluoropropionate ($C_2F_5CO_2^-$), heptafluorobutyrate ($CF_3CF_2CF_2CO_2^-$), perchlorate ($ClO_4^-\cdot H_2O$), p-toluenesulfonate (p-$CH_3C_6H_4SO_3^-$), carboranes of the formula $CB_{11}H_6X_6^-$ wherein X is hydrogen or a halogen selected from Cl, Br, I, and F, and tetraphenyl borates represented by the formula:

wherein $R^{11}$ independently represents hydrogen, fluorine and trifluoromethyl and n' is 1 to 5.

A preferred single component catalyst of the foregoing embodiment are represented by the formula:

VIII

The catalyst comprises a π-allyl Group VIII metal complex with a weakly coordinating counteranion. The allyl group of the metal cation complex is provided by a compound containing allylic functionality which functionality is bound to the M by a single carbon-metal σ-bond and an olefinic π-bond. The Group VIII metal M is preferably selected from nickel and palladium with palladium being the most preferred metal. As discussed above, it will be understood that the catalysts are solvated by the reaction diluent which diluent can be considered very weak ligands to the Group VIII metal in the cation complex.

Substituents $R^{20}$, $R^{21}$, and $R^{22}$ on the allyl groups set forth above in Structures III, IV, and VIII are each independently hydrogen, branched or unbranched ($C_1$-$C_5$) alkyl such as methyl, ethyl, n-propyl, isopropyl, and t-butyl, ($C_6$-$C_{14}$) aryl, such as phenyl and naphthyl, ($C_7$-$C_{10}$) aralkyl such as benzyl, —$COOR^{23}$, —$(CH_2)_nOR^{23}$, Cl and ($C_5$-$C_6$) cycloaliphatic, wherein $R^{23}$ is linear or branched ($C_1$-$C_5$) alkyl, such as methyl, ethyl, n-propyl, isopropyl, n-butyl and i-butyl and is an integer from 0 to 6.

Any two of $R^{20}$, $R^{21}$, and $R^{22}$ can be linked together to form a cyclic- or multicyclic ring structure. The cyclic ring structure can be carbocyclic or heterocyclic.

Additional examples of π-allyl metal complexes are found in R. G. Guy and B. L. Shaw, *Advances in Inorganic Chemistry and Radiochemistry*, Vol. 4, Academic Press Inc., New York, 1962; J. Birmingham, E. de Boer, M. L. H. Green, R. B. King, R. Koster, P. L. I. Nagy, G. N. Schrauzer, *Advances in Organometallic Chemistry*, Vol. 2, Academic Press Inc., New York, 1964; W. T. Dent, R. Long and A. J. Wilkinson, J. Chem. Soc., (1964)1585; and H. C. Volger, Rec. Trav. Chim. Pay Bas, 88 (1969)225; which are all hereby incorporated by reference.

In another catalyst embodiment, L represents a phosphine, phosphite or bipyridyl type ligand. In this embodiment y' of the formula $[L_{y'}MX'_{z'}][CA]_a$ is 1. The phosphine ligand can be a monodentate phosphine or hemilabile phosphine. By hemilabile phosphine is meant a weakly chelating phosphine ligand containing an additional heteroatom substituent, (e.g., oxygen or sulfur), capable of weakly complexing the group VIII metal. The monodentate ligand is represented by the formula $P(R^{24})_3$ wherein $R^{24}$ independently represents linear and branched ($C_1$-$C_{12}$) alkyl, cycloalkyl and ($C_6$-$C_{14}$) aryl and substituted aryl. Representative alkyl groups include but are not limited to methyl, ethyl, propyl, isopropyl, butyl, isobutyl, sec-butyl, tert-butyl, pentyl, neopentyl, hexyl, heptyl, octyl, nonyl, decyl, and dodecyl. Representative cycloalkyl groups include but are not limited to cyclopentyl and cyclohexyl. Representative aryl groups include but are not limited to phenyl, substituted phenyl, and naphthyl, and substituted naphthyl. By substituted aryl is meant that the aryl groups contain linear or branched ($C_1$-$C_{12}$) alkyl groups as defined above under $R^{24}$, and/or halogen groups selected from chlorine, bromine, iodine, and fluorine. Examples of suitable monodentate phosphines include but are not limited to triethylphosphine, triisopropylphosphine, tricyclopentylphosphine, tricyclohexylphosphine, triphenylphosphine, trinaphthylphosphine, tri-p-tolylphosphine, and tri-o-tolylphosphine. The hemilabile phosphine ligand is represented by the formula $P(R^{24})_2Q$ wherein $R^{24}$ is the same as defined above and Q represents an organic moiety containing a heteroatom, selected from phosphorous, oxygen, and sulfur and combinations thereof. Examples of the Q substituent include but are not limited to -dibenzothiophene, ortho-alkoxyphenyl-, ortho-alkoxycarbonylphenyl-, wherein the alkoxy group is linear or branched ($C_1$-$C_5$) alkoxy; —$(CH_2)_qS(O)C_6H_5$, —$(CH_2)_qSC_6H_5$, —$(CH_2)_qP(O)(C_6H_5)_2$, —$(CH_2)_qP(S)(C_6H_5)_2$, wherein q is 2 or 3. Preferably the hemilabile phosphine ligand weakly chelates the Group VIII metal forming a 5 or 6 membered ring together with the phosphine phosphorus atom, the heteroatom (preferably O or S) and the group VIII metal. Excluded from this class of ligands are the strongly chelating ligands, e.g., the diphosphines such as diphenylphosphinoethane and diphenylphosphinopropane. Specific examples of suitable hemilabile phosphine ligands are illustrated below:

The phosphite ligands are represented by the formula $P(OR^{24})_3$ wherein $R^{24}$ can be the same or different and is the same as defined above. Examples of phosphite ligands include but are not limited to trimethylphosphite, triethylphosphite, tri-n-propylphosphite, triisopropylphosphite, tri-n-butylphosphite, triisobutylphoshite, tri-t-butylphosphite, tricyclohexylphosphite, and triphenylphosphite.

The bipyridyl ligand can be a 2,2'-bipyridine ring system, or a fused bipyridyl ring system (phenanthrene) selected from the formulae below:

wherein $R^{25}$ independently represents hydrogen, linear and branched ($C_1$–$C_{12}$) alkyl, linear and branched ($C_1$–$C_{12}$) alkoxy, and ($C_6$–$C_{14}$) aryl and substituted aryl, aryloxy and substituted aryloxy. Representative alkyl groups include but are not limited to methyl ethyl, propyl, isopropyl, butyl, isobutyl, sec-butyl, tert-butyl, pentyl, neopentyl, hexyl, heptyl, octyl, nonyl, decyl, and dodecyl. Representative alkoxy groups include but are not limited to methoxy, ethoxy, propoxy, isopropoxy, butoxy, sec-butoxy, tert-butoxy, pentoxy, and neopentoxy. Representative aryl and aryloxy groups and substituted derivatives thereof include but are not limited to phenyl, phenoxy, tolyl and naphthyl, as well as halogenated (especially fluorinated) derivatives thereof.

The monodentate phosphine ligands are preferred, most preferably, triaryl or tricyclohexylphosphines. Optionally the preferred phosphine ligands can be substituted with sulfonate metal salts such as —$SO_3Na$ which impart the resulting catalysts with solubility in water should the copolymerization be run in aqueous media.

The single component catalyst of the foregoing embodiments can be prepared by combining a ligated Group VIII metal halide or pseudohalide (defined hereinbelow) with a counteranion providing salt or a strong Lewis acid such as tris[3,5-bis(trifluoromethyl phenyl)]boron and tris (pentaflurophenyl)boron that provides the counteranion for the subsequently formed metal cation complex. The ligated Group VIII metal halide component, the counteranion providing salt or Lewis acid, and optional π-bond containing component, e.g., COD, are combined in a solvent capable of solvating the formed single component catalyst. The solvent utilized is preferably the same solvent chosen for the reaction medium. The catalyst can be preformed in solvent or can be formed in situ in the reaction medium.

Suitable counteranion providing salts are any salts capable of providing the counteranions discussed above. For example, salts of sodium, lithium, potassium, silver, thallium, and ammonia, wherein the anion is selected from the counteranions ($CA^-$) defined previously. Illustrative counteranion providing salts include $TIPF_6$, $AgPF_6$, $AgSbF_6$, $LiBF_4$, $NH_4PF_6$, $KAsF_6$, $AgC_2F_5CO_2$, $AgBF_4$ $AgCF_3CO_2$, $AgClO_4.H_2O$, $AgAsF_6$, $AgCF_3CF_2CF_2CO_2$, $AgC_2F_5CO_2$, $(C_4H_9)_4NB(C_6F_5)_4$, $LiB(C_6F_5)_4$, $LiB(C_6F_5)_4$ etherate, and $AgCB_{11}H_6X_6$ wherein X is hydrogen or a halogen selected from Cl, Br, I, and F.

The specific catalyst: $[allyl-Pd—COD]^+PF_6^-$ is preformed by forming a ligated palladium halide component, i.e., bis(allyl Pd bromide), which is then subjected to scission with a halide abstracting agent in the form of a counteranion providing salt, i.e., TlPF$_6$ in the presence of COD. The reaction sequence is written as follows:

When partitioned, only one COD ligand remains, which is bonded by two π-bonds to the palladium. The allyl functionality is bonded by one metal-carbon σ-bond and one π-bond to the palladium.

For the preparation of the π-allyl Group VIII metal/counteranion single component catalysts represented in Structure VIII above, i.e., when M is palladium, allylpalladium chloride is combined with the desired counteranion providing salt, preferably silver salts of the counteranion, in an appropriate solvent. The chloride ligand comes off the allyl palladium complex as a precipitate of silver chloride (AgCl) which can be filtered out of the solution. The allylpalladium cation complex/counteranion single component catalyst remains in solution. The palladium metal is devoid of any ligands apart from the allylic functionality.

Reactions utilizing the single component catalysts of the present invention are carried out in an organic solvent which does not adversely interfere with the catalyst system and is a solvent for the monomer. Examples of organic solvents are aliphatic (non-polar) hydrocarbons such as pentane, hexane, heptane, octane and decane; alicyclic hydrocarbons such as cyclopentane and cyclohexane; aromatic hydrocarbons such as benzene, chlorobenzene, o-dichlorobenzene, toluene, and xylenes; halogenated (polar) hydrocarbons such as methylene chloride, chloroform, carbon tetrachloride, ethyl chloride, 1,1-dichloroethane, 1,2-dichloroethane, 1,2-dichloroethylene, 1-chloropropane, 2-chloropropane, 1-chlorobutane, 2-chlorobutane, 1-chloro-2-methylpropane, and 1-chloropentane. When phosphines, phosphites, and bipyridyl type ligands are employed as Group VIII catalyst ligands, water can be used as the reaction solvent.

When water is employed as the reaction solvent, the preferred ligands are selected from the phosphines described above. It is possible to control the partitioning of the catalyst between the organic (monomer) and aqueous phases by appropriate choice of the phosphine ligand. For example, the use of tricyclohexyl phosphine causes the catalyst to reside primarily in the monomer phase whereas the use of the sodium salt of tris(3-sulfonatophenyl) phosphine results in a catalyst dissolved essentially in the aqueous phase. Optionally, a surfactant such as an ionic surfactant (e.g., sodium lauryl sulfate) or a neutral surfactant (e.g., ethyleneoxide based surfactants marketed under the trademark Igepal® of the GAF Corporation) can be employed.

In another embodiment the comonomers of the invention are polymerized in the presence of a multicomponent catalyst system. In this embodiment, the catalyst is formed from catalyst components comprising a Group VIII metal ion source in combination with an organometal cocatalyst and, preferably, a third component. The cocatalyst is selected from organoaluminum compounds, dialkylaluminum hydrides, dialkyl zinc compounds, dialkyl magnesium compounds, and aLkyllithium compounds.

The Group VIII metal ion source is preferably selected from a compound containing nickel or palladium. There are no restrictions on the Group VIII metal compound so long as it provides a source of catalytically active Group VIII metal ions. Preferably, the Group VIII metal compound is soluble or can be made to be soluble in the reaction medium.

The Group VIII metal compound comprises ionic and/or neutral ligand(s) bound to the Group VIII metal. The ionic and neutral ligands can be selected from a variety of monodentate, bidentate, or multidentate moieties and combinations thereof.

Representative of the ionic ligands that can be bonded to the metal to form the Group VIII compound are anionic ligands selected from the halides such as chloride, bromide, iodide or fluoride ions; pseudohalides such as cyanide, cyanate, thiocyanate, enolates of β-dicarbonyl compounds such as acetylacetonate (4-pentanedionate), 2,2,6,6-tetramethyl-3,5-heptanedionate, and halogenated acetylacetonoates such as 1,1,1,5,5,5-hexafluoro-2,4-pentanedionate, 1,1,1-trifluoro-2,4,pentanedionate; anions of acidic oxides of carbon such as carboxylates and halogenated carboxylates (e.g., acetates, 2-ethylhexanoate, neodecanoate, trifluoroacetate, etc.) and oxides of nitrogen (e.g., nitrates, nitrites, etc.) of bismuth (e.g., bismuthate, etc.), of aluminum (e.g., aluminates, etc.), of silicon (e.g., silicate, etc.), of phosphorous (e.g., phosphates, phosphites, phosphines, etc.) of sulfur (e.g., sulfates such as triflate, p-toluene sulfonate, sulfites, etc.); ylides; amides; imides; oxides; phosphides; sulfides; ($C_6$–$C_{24}$) aryloxides, ($C_1$–$C_{20}$) alkoxides, hydroxide, hydroxy ($C_1$–$C_{20}$) alkyl; catechols; oxalate; chelating alkoxides and aryloxides. Palladium compounds can also contain complex anions such as $PF^-_6$, $AlF_3O_3SCF^-_3$, $SbF^-_6$ and compounds represented by the formulae:

$$Al(R^6)^-_4, B(R^{26})^-_4$$

wherein $R^{26}$ independently represents a halogen atom selected from Cl, F, I, and Br, or a substituted or unsubstituted hydrocarbyl group. Representative hydrocarbyl groups are selected from linear or branched ($C_1$–$C_{25}$) alkyl such as methyl, ethyl, propyl, isopropyl, butyl, isobutyl, sec-butyl, pentyl, neopentyl, hexyl, heptyl, octyl, nonyl, decyl, undecyl, dodecyl, tridecyl, tetradecyl, pentadecyl, hexadecyl, heptadecyl, octadecyl, nonodecyl, eicosyl, heneicosyl, docosyl, tricosyl, tetracosyl, pentacosyl, and isomeric forms thereof; ($C_2$–$C_{25}$) alkenyl such as vinyl, allyl, crotyl, butenyl, pentenyl, hexenyl, octenyl, nonenyl, decenyl, undecenyl, dodecenyl, tridecenyl, tetradecenyl pentadecenyl, hexadecenyl, heptadecenyl, octadecenyl, nonadecenyl, pentacosenyl, and isomeric forms thereof; ($C_6$–$C_{25}$) aryl such as phenyl, tolyl, xylyl, and naphthyl; ($C_7$–$C_{25}$) aralkyl such as benzyl, phenethyl, phenpropyl, phenbutyl, phenhexyl, and napthoctyl; ($C_3$–$C_8$) cycloalkyl such as cyclopropyl, cyclobutyl, cyclopentyl, cyclohexyl, cycloheptyl, cyclooctyl, 2-norbomyl, 2-norbomenyl, and the like. In addition to the above definitions $R^{26}$ represents the radical:

The term "substituted hydrocarbyl" means the hydrocarbyl group as previously defined wherein one or more hydrogen atoms have been replaced with a halogen atom such as Cl, F, Br, and I (e.g., perfluorophenyl); hydroxyl; amino; alkyl; nitro; and mercapto.

Representatives of the neutral ligands which can be bonded to the Group VIII transition metal are the olefins; the acetylenes; carbon monoxide; nitric oxide, nitrogen compounds such as ammonia, alkylisocyanide, alkylisocyanate, alkylisothiocyanate; pyridines and pyridine derivatives (e.g., 1,10-phenanthroline, 2,2'-dipyridyl), 1,4-dialkyl-1,3-diazabutadienes, 1,4-diaryl-1,3-diazabutadienes and amines such as represented by the formulae:

wherein $R^{31}$ is independently hydrocarbyl or substituted hydrocarbyl as previously defined and n is 2 to 10. Ureas; nitrites such as acetonitrile, benzonitrile and halogenated derivatives thereof; organic ethers such as dimethyl ether of diethylene glycol, dioxane, tetrahydrofuran, furan diallyl ether, diethyl ether, cyclic ethers such as diethylene glycol cyclic oligomers; organic sulfides such as thioethers (diethyl sulfide); arsines; stibines; monodentatate and hemilabile phosphines such as described above; phosphine oxides, phosphorus halides; and phosphites of the formula $P(OR^{24})_3$, wherein $R^{24}$ is the same as defined above; phosphorus oxyhalides; phosphonates; phosphonites, phosphinites, ketones; sulfoxides such as $(C_1-C_{20})$ alkylsulfoxides; $(C_6-C_{20})$ arylsulfoxides, $(C_7-C_{40})$ alkarylsulfoxides, and the like. It should be recognized that the foregoing neutral ligands can be utilized as optional third components as will be described hereinbelow.

Examples of Group VIII transition metal compounds suitable as the Group VIII metal ion source include: palladium ethylhexanoate, trans-Pd $Cl_2(PPh_3)_2$, palladium (II) bis(trifluoroacetate), palladium (II) bis(acetylacetonate), palladium (II) 2-ethylhexanoate, Pd(acetate)$_2$(PPh$_3$)$_2$, palladium (II) bromide, palladium (II) chloride, palladium (II) iodide, palladium (II) oxide, monoacetonitriletris(triphenylphosphine)palladium (II) tetrafluoroborate, tetrakis(acetonitrile)palladium (II) tetrafluoroborate, dichlorobis(acetonitrile)palladium (II), dichlorobis(triphenylphosphine)palladium (II), dichlorobis(benzonitrile)palladium (II), palladium acetylacetonate, palladium bis(acetonitrile)dichloride, palladium bis(dimethylsulfoxide)dichloride, nickel acetylacetonates, nickel carboxylates, nickel dimethylglyoxime, nickel ethylhexanoate, bis(2,2,6,6-tetramethyl-3,5-heptanedionate) nickel (II), nickel (II) hexafluoroacetylacetonate tetrahydrate, nickel (II) trifluoroacetylacetonate dihydrate, nickel (II) acetylacetonate tetrahydrate, nickelocene, nickel (II) acetate, nickel bromide, nickel chloride, dichlorohexyl nickel acetate, nickel lactate, nickel oxide, nickel tetrafluoroborate.

The organoaluminum component of the multicomponent catalyst system of the present invention is represented by the formula:

$$AlR^{32}_{3-x''}Q'_{x''}$$

wherein $R^{32}$ independently represents linear and branched $(C_1-C_{20})$ alkyl, $(C_6-C_{24})$ aryl, $(C_7-C_{20})$ aralkyl, $(C_3-C_{10})$ cycloalkyl; Q' is a halide or pseudohalide selected from chlorine, fluorine, bromine, iodine, linear and branched $(C_1-C_{20})$ alkoxy, $(C_6-C_{24})$ aryloxy; and x" is 0 to 2.5, preferably 0 to 2.

Representative organoaluminum compounds include trialkylaluminums such as trimethylaluminum, triethylaluminum, tripropylaluminum, triisopropylaluminum, triisobutylaluminum, tri-2-methylbutylaluminum, tri-3-methylbutylaluminum, tri-2-methylpentylaluminum, tri-3-methylpentylaluminum, tri4-methylpentylaluminum, tri-2-methylhexylaluminum, tri-3-methylhexylaluminum, trioctylaluminum, and tris-2-norbomylaluminum; dialkylaluminum halides such as dimethylaluminum chloride, diethylaluminum chloride, diisopropylaluminum chloride, and diisobutylaluminum chloride; monoalkylaluminum dihalides such as methylaluminum dichloride, ethylaluminum dichloride, ethylaluminum diiodide, propylaluminum dichloride, isopropylaluminum dichloride, butylaluminum dichloride, and isobutylaluminum dichloride; and alkylaluminum sesquihalides such as methylaluminum sesquichloride, ethylaluminum sesquichloride, propylaluminum sesquichloride, and isobutylaluminum sesquichloride.

The dialkylaluminum hydride is selected from linear and branched $(C_1-C_{10})$ dialkylaluminum hydride, with diisobutylaluminum hydride being a preferred dialkylaluminum hydride compound.

The dialkyl zinc compounds are selected from linear and branched $(C_1-C_{10})$ dialkyl zinc compounds with diethyl zinc being preferred. The dialkyl magnesium compounds are selected from linear and branched $(C_1-C_{10})$ dialkyl magnesium with dibutyl magnesium being the most preferred. The alkyl lithiums are selected from linear and branched $(C_1-C_{10})$ alkyl lithium compounds. Butyllithium is the preferred alkyl lithium.

In the practice of the present invention, the multicomponent catalytic system obtained from the Group VIII metal ion source is utilized with one or both of a component selected from the group of cocatalyst compounds, and third component compounds.

Examples of third components are strong Lewis acids such as the $BF_3$.etherate, $TiCl_4$, $SbF_5$, and tris(perfluorophenyl)boron.

As set forth above the neutral ligands can be employed as optional third components with electron donating properties.

In one embodiment of the invention, the multicomponent catalyst system can be prepared by a process which comprises mixing the catalyst components, i.e., the Group VIII metal compound or ion source, the cocatalyst compound, and third component (if employed), together in a hydrocarbon or halohydrocarbon solvent and then mixing the premixed catalyst system in the reaction medium comprising the monomer. Alternatively, (assuming the optional third component is utilized), any two of the catalyst system components can be premixed in a hydrocarbon or halohydrocarbon solvent and then introduced into the reaction medium. The remaining catalyst component can be added to the reaction medium before or after the addition of the premixed components.

In another embodiment, the multicomponent catalyst system can be prepared in situ by mixing together all of the catalyst components in the reaction medium. The order of addition is not important.

In one embodiment of the multicomponent catalyst system of the invention, the catalyst system comprises a nickel salt, e.g., nickel ethylhexanoate, an organoaluminum compound, e.g., triethylaluminum, and a third component Lewis acid, e.g., tris(perfluorophenyl)boron as shown in the following scheme:

Reactions utilizing the single and multicomponent catalysts of the present invention are carried out in an organic solvent which does not adversely interfere with the catalyst system and is a solvent for the monomer. Examples of organic solvents are aliphatic (non-polar) hydrocarbons such as pentane, hexane, heptane, octane and decane; alicyclic hydrocarbons such as cyclopentane and cyclohexane; aromatic hydrocarbons such as benzene, chlorobenzene, o-dichlorobenzene, toluene, and xylenes; halogenated (polar) hydrocarbons such as methylene chloride, chloroform, carbon tetrachloride, ethyl chloride, 1,1-dichloroethane, 1,2-dichloroethane, 1,2-dichloroethylene, 1-chloropropane, 2-chloropropane, 1-chlorobutane, 2-chlorobutane, 1-chloro-2-methylpropane, and 1-chloropentane.

The molar ratio of total monomer to Group VIII metal for the single and multicomponent catalysts of the invention range from 20:1 to 100,000:1, preferably 50:1 to 20,000:1, and most preferably 100:1 to 10,000:1.

In the multicomponent catalyst systems, the cocatalyst metal (e.g., aluminum, zinc, magnesium, and lithium) to Group VIII metal molar ratio ranges from less than or equal to 100:1, preferably less than or equal to 30:1, and most preferably less than or equal to 20:1.

The third component is employed in a molar ratio to Group VIII metal ranging from 0.25:1 to 20:1.

The temperature at which the polymerization reactions of the present invention are carried out typically ranges from −100° C. to 120° C., preferably −60° C. to 90° C., and most preferably −10° C. to 80° C.

The choice of reaction solvent is made on the basis of a number of factors including the choice of catalyst and whether it is desired to run the polymerization as a slurry or solution process. For most of the catalysts described in this invention, the preferred solvents are chlorinated hydrocarbons such as methylene chloride and 1,2-dichloroethane and aromatic hydrocarbons such as benzene, toluene, chlorobenzene, and nitrobenzene, with simple hydrocarbons being less preferred due to the resulting lower conversion of the functional norbornene-type monomer(s).

The polymers of the invention are produced in a molecular weight (Mn) range from about 1,000 to about 1,000,000, preferably from about 2,000 to about 500,000, more preferably from about 5,000 to about 100,000.

The polymers of the present invention are useful in electronic, optical and high temperature thermoplastic (e.g., pipe, fiber) applications. For electronic (e.g. photoresist) applications the molecular weight preferably ranges from about 5,000 to 20,000 (Mn). For high temperature thermoplastic applications the molecular weight preferably ranges from about 40,000 to 100,000 (Mn).

In one embodiment of the invention the polycyclic/acrylic polymers are useful as components in resist materials utilized in the manufacture of integrated circuits. The patterning of IC's is carried out according to various lithography techniques known in the art. Photolithography employing ultraviolet (UV) light and increasingly deep UV light or other radiation is a fundamental and important technology utilized in the production of IC devices. A photosensitive polymer film (photoresist) is applied over a substrate surface (e.g., wafer) and dried. A photomask containing the desired patterning information is then placed in close proximity to the photoresist film. The photoresist is irradiated through the overlying photomask by one of several types of imaging radiation including UV light, electron beams, x-rays, or ion beams. Upon exposure to radiation, the photoresist undergoes a chemical change with attendant changes in solubility. After irradiation, the substrate is soaked in a solution that develops (i.e., selectively removes either the exposed or unexposed regions) the patterned images in the photosensitive polymer film. Depending on the type of photoresist used, or the polarity of the developing solvent, either the exposed or nonexposed areas of film are removed in the developing process to expose the underlying substrate, after which the patterned exposed or unwanted substrate material is removed or changed by an etching process leaving the desired pattern in a functional layer of the wafer. The remaining photoresist material functions as a protective barrier against the etching process. Removal of the remaining photoresist material gives the patterned circuit. Etching is accomplished by plasma etching, sputter etching, and reactive ion etching (RIE).

The polycyclic/acrylic copolymers of the invention that contain acid labile groups pendant from the backbone can be used in radiation sensitive photoresist compositions. The photoresist compositions of the present invention comprise the disclosed polycyclic/acrylic copolymer compositions, a solvent, and an photosensitive acid generator (photoinitiator). Preferably, a dissolution inhibitor can be added in an amount of up to about 20 weight percent of the composition. A suitable dissolution inhibitor is t-butyl cholate (J. V. Crivello et al., Chemically Amplified Electron-Beam Photoresists, *Chem. Mater.*, 1996, 8, 376–381).

Upon exposure to radiation, the radiation sensitive acid generator generates a strong acid. Suitable photoacid generators include triflates (e.g., triphenylsulfonium triflate), pyrogallol (e.g., trimesylate of pyrogallol); onium salts such as triarylsulfonium and diaryliodium hexafluoroantimonates, hexafluoroarsenates, trifluoromethanesulfonates; esters of hydroxyimides, α,α-bis-sulfonyl-diazomethanes, sulfonate esters of nitro-substituted benzyl alcohols and napthoquinone-4-diazides. Other suitable photoacid generators are disclosed in Reichmanis et al., *Chem. Mater.* 3, 395, (1991). Compositions containing triarylsulfonium or diaryliodonium salts are preferred because of their sensitivity to deep UV light (193 to 300 nm) and they give very high resolution images. Most preferred are the unsubstituted and symmetrically or unsymmetrically substituted diaryliodium or triarylsulfonium salts. The photoacid initiator component comprises about 1 to 100 w/w percent to polymer. The preferred concentration range is 5 to 50 w/w percent.

The photoresist compositions of the present invention optionally contain a sensitizer capable of sensitizing the photoacid initiator to longer wave lengths ranging from mid UV to visible light. Depending on the intended application, such sensitizers include polycyclic aromatics such as pyrene and perylene. The sensitization of photoacid initiators is well-known and is described in U.S. Pat. Nos. 4,250,053; 4,371,605; and 4,491,628 which are all incorporated herein by reference. The invention is not limited to a specific class of sensitizer or photoacid initiator.

The process for generating a positive tone resist image on a substrate comprises the steps of: (a) coating a substrate with a film comprising the positive tone resist composition of the present invention; b) imagewise exposing the film to radiation; and (c) developing the image.

The first step involves coating the substrate with a film comprising the resist polymer composition dissolved in a suitable solvent preferably, at about 5 to 40 weight/volume percent of solids, more preferably 10 to 30 weight/volume percent. Suitable substrates are comprised of silicon, ceramics, polymer or the like. Suitable solvents include propylene glycol methyl ether acetate (PGMEA), cyclohexanone, butyrolactate, ethyl lactate, and the like. The film can be coated on the substrate using art known techniques such as spin or spray coating, or doctor blading. Preferably, before the film has been exposed to radiation, the film is heated to an elevated temperature of about 90° C. to 150° C. for a short period of time of about 1 min. In the second step of the process, the film is imagewise exposed to radiation suitably electron beam or electromagnetic preferably electromagnetic radiation such as ultraviolet or x-ray, preferably ultraviolet radiation suitably at a wave length of about 193 to 514 nm preferably about 193 nm to 248 nm. Suitable radiation sources include mercury, mercury/xenon, and xenon lamps, argon fluoride and krypton fluoride lasers, x-ray or e-beam. The radiation is absorbed by the radiation-sensitive acid generator to produce free acid in the exposed area. The free acid catalyzes the cleavage of the acid labile pendant group of the copolymer which converts the copolymer from dissolution inhibitor to dissolution enhancer thereby increasing the solubility of the exposed resist composition in an aqueous base. Preferably, after the film has been exposed to radiation, the film is again heated to an elevated temperature of about 90° C. to 150° C. for a short period of time of about 1 minute.

The third step involves development of the positive tone image with a suitable solvent. Suitable solvents include aqueous base preferably an aqueous base without metal ions such as tetramethyl ammonium hydroxide or chorine. The composition of the present invention provides positive images with high contrast and straight walls. Uniquely, the dissolution property of the composition of the present invention can be varied by simply varying the composition of the copolymer.

The following examples are detailed descriptions of methods of preparation and use of certain compositions of the present invention. The detailed preparations fall within the scope of, and serve to exemplify, the more generally described methods of preparation set forth above. The examples are presented for illustrative purposes only, and are not intended as a restriction on the scope of the invention.

Catalyst Component A=$(C_6H_5)_2P(CH_2CH_2S(O)C_6H_5)$ $PdCl_2$

Catalyst B=$\eta^3$-crotyl nickel(cyclooctadiene) hexafluorophosphate

Catalyst Component C=(allyl)Pd(tricyclohexylphosphine)chloride

Catalyst Component D=bipyridyl palladium dichloride

EXAMPLE 1

To a thick-walled, septum-sealed 100 ml glass vial, equipped with a magnetic stir bar was added norbornene (2.5 g, 26.5 mmol), dichloroethane (35 ml) and methylacrylate (2.38 ml, 26.5 mmol). Thereafter was added catalyst A (13.4 mg, 26 $\mu$mol) dissolved in dichloroethane (2 ml), trispentafluorophenylboron (234 $\mu$mol) and triethylaluminum (0.16 ml (1.7 molar in cyclohexane), 260 $\mu$mol). The resulting stirred solution was placed in a heated oil bath at 50° C. for a total of 48 hours. After 48 hours the polymer was precipitated by pouring the reaction mixture into excess methanol (300 ml), filtered, and washed with excess methanol prior to drying to constant weight under vacuum at 80° C.

The dried, white, granular polymer was found to weigh 0.5 g. Proton NMR revealed the polymer to be free of any solvents or unconverted monomer. The proton NMR also indicated the product to be a random copolymer of the two monomers (77 mole % norbomene, 23 mole % methylacrylate).

EXAMPLE 2

To a thick-walled, septum-sealed 100 ml glass vial, equipped with a magnetic stir bar was added norbornene (2.5 g, 26.5 mmol), dichloroethane (35 ml) and methylacrylate (2.38 ml, 26.5 mmol). Thereafter was added catalyst B (9.5 mg, 26 $\mu$mol) dissolved in dichloroethane (1 ml). The resulting stirred solution was placed in a heated oil bath at 50° C. for a total of 18 hours. After 18 hours the polymer was precipitated by pouring the reaction mixture into excess methanol (300 ml), filtered, and washed with excess methanol prior to drying to constant weight under vacuum at 80° C.

The dried, white, granular polymer was found to weigh 0.3 g. Proton NMR revealed the polymer to be free of any solvents or unconverted monomer. The proton NMR also indicated the product to be a random copolymer of the two monomers (65 mole % methylacrylate, 35 mole % norbomene).

EXAMPLE 3

To a thick-walled, septum-sealed 50 ml glass vial, equipped with a magnetic stir bar was added norbornene (5.0 g, 53.1 mmol), toluene (10 ml) and methylacrylate (2.38 ml, 26.5 mmol). Thereafter was added catalyst C (25 mg, 53 $\mu$mol) premixed for 1 minute in toluene (2 ml) with lithium tetrakis(pentfluorphenyl)boron etherate (46 mg, 53 $\mu$mol). The resulting stirred solution was placed in a heated oil bath at 50° C. for a total of 17 hours. After 17 hours the polymer was precipitated by pouring the reaction mixture into excess methanol (300 ml), filtered, and washed with excess methanol prior to drying to constant weight under vacuum at 80° C.

The dried, white, granular polymer was found to weigh 1.16 g. Proton NMR revealed the polymer to be free of any solvents or unconverted monomer. The proton NMR also indicated the product to be a random copolymer of the two monomers. The molecular weight (relative to polystyrene standards) was measured using GPC methods and found to be: Mw 57,000, Mn 30,000 and polydispersity 1.9, (87 mole % norbomene, 13 mole % methylacrylate).

EXAMPLE 4

To a thick-walled, septum-sealed 100 ml glass vial, equipped with a magnetic stir bar was added norbornene (2.5 g, 26.5 mmol), dichloroethane (35 ml) and methylaciylate (2.38 ml, 26.5 mmol). Thereafter was added catalyst B (19 mg, 53 $\mu$mol) dissolved in dichloroethane (3 ml), premixed (for 3 minutes at ambient temperature) with tricyclohexylphosphine (14.6 mg, 53 $\mu$mol). The resulting stirred solution was placed in a heated oil bath at 50° C. for a total of 18 hours. After 18 hours the polymer was precipitated by pouring the reaction mixture into excess methanol (300 ml), filtered ,and washed with excess methanol prior to drying to constant weight under vacuum at 80° C.

Figure 1:
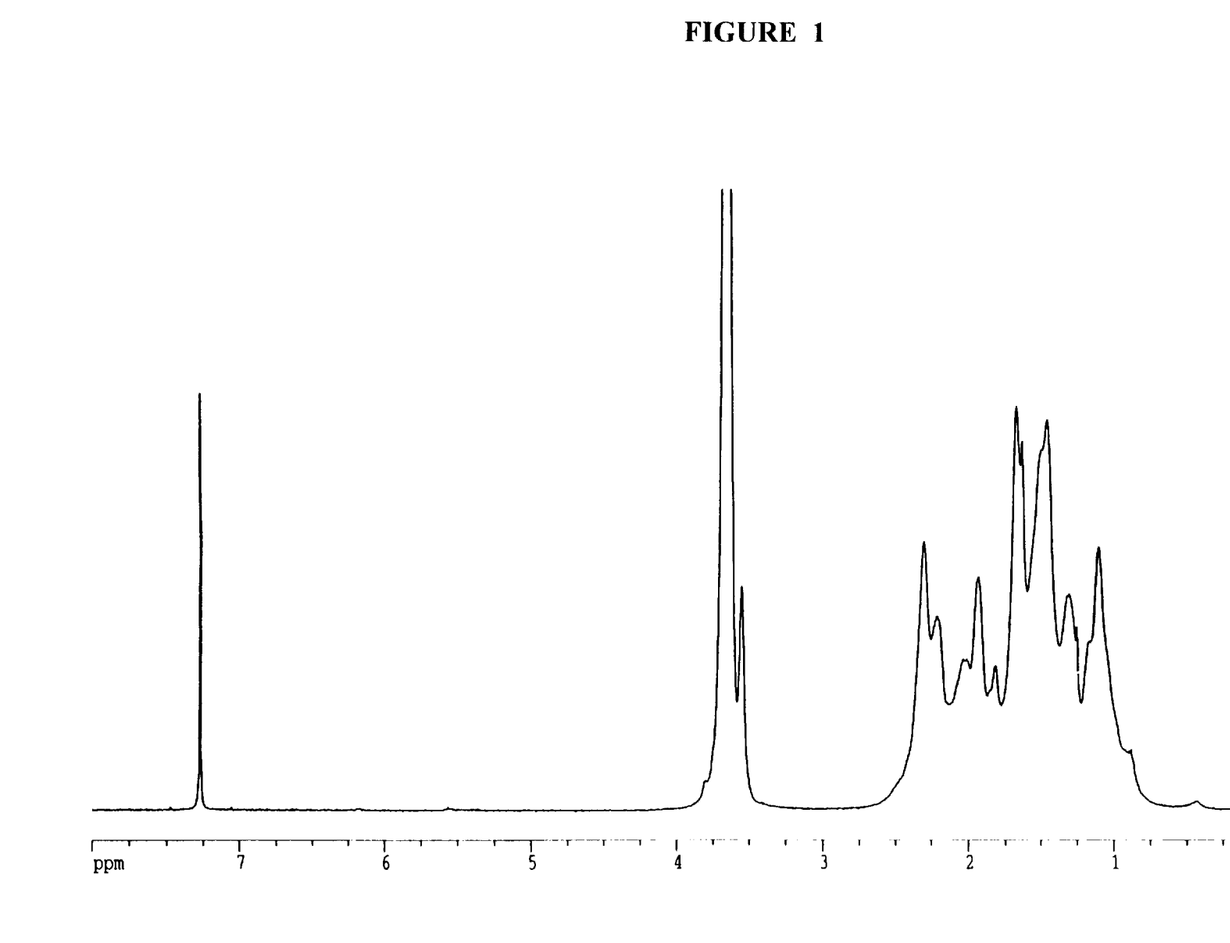
FIG. 1 is a 500 MHz $^1$H-NMR spectrum of a polycyclic/acrylic copolymer of the invention.
Figure 2:
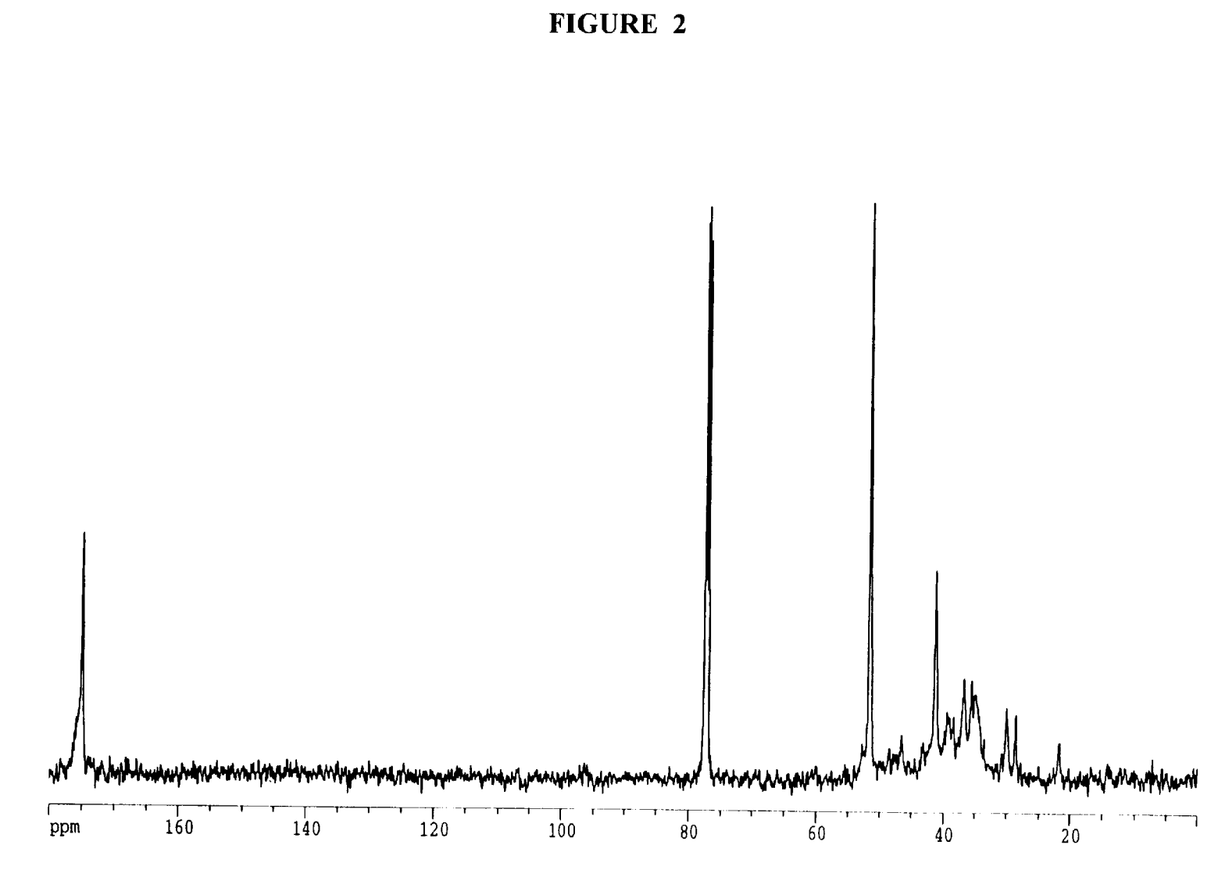
FIG. 2 is a 125.77 MHz $^{13}$C-NMR spectrum of the same copolymer shown in FIG. 1.
Figure 3:
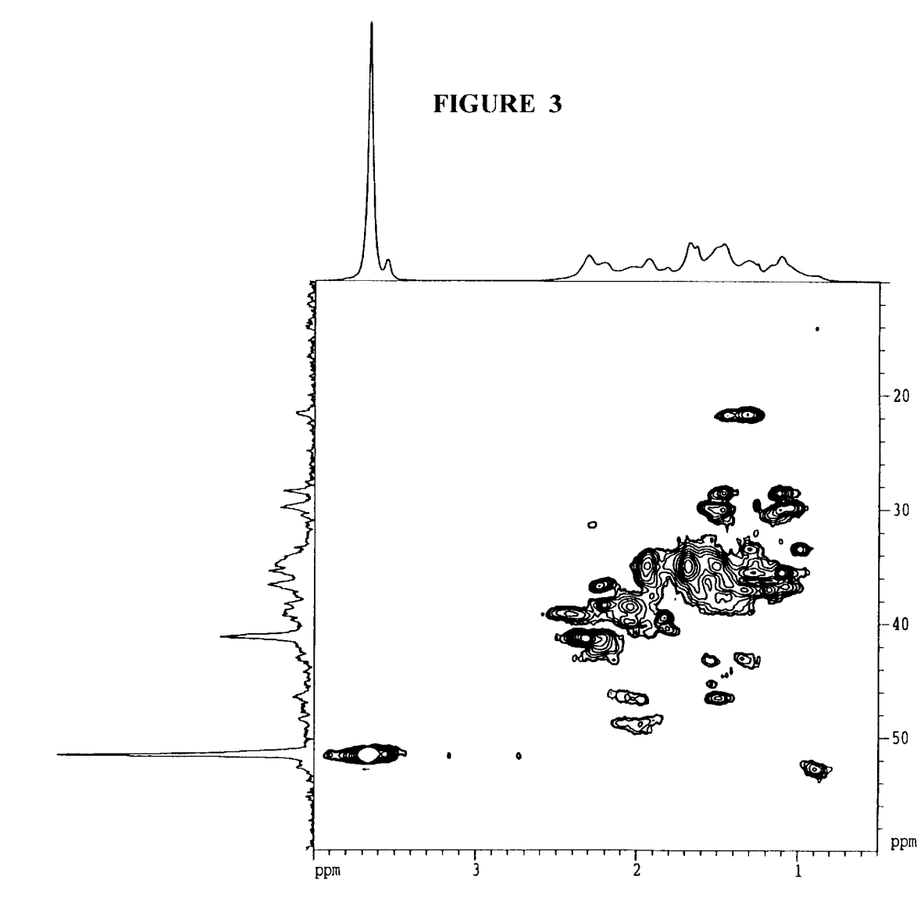
FIG. 3 is a proton-carbon correlation 2-D-NMR spectrum (HSQC) of the same copolymer as shown in FIGS. 1 and 2.

The dried, white, granular polymer was found to weigh 0.35 g. Proton NMR revealed the polymer to be free of any solvents or unconverted monomer. The NMR spectra shown in FIGS. 1, 2, and 3 also indicates that the product is a random copolymer of the two monomers (85 mole % methylacrylate, 15 mole % norbomene).

A second confirmation for the formation of a random copolymer is the Field desorption ionization-mass spectrum (not shown) of the copolymer. The pyrolysis that occurred during the analysis yielded mass peaks corresponding to oligomers containing both methylacrylate and norbomene repeating units.

EXAMPLE 5

To a thick-walled, septum-sealed 100 ml glass vial, equipped with a magnetic stir bar was added norbomene (2.5 g, 26.5 mmol), deionized water (20 ml), which had been purged with nitrogen for 15 minutes and methylacrylate (2.38 ml, 26.5 mmol). Thereafter was added a largely homogeneous solution made by mixing (for 30 minutes, under nitrogen in an ultrasonicator) allylpalladium chloride dimer (9.7 mg, 53 $\mu$mol), deionized water (3 ml), tris(3-sulfonatophenyl)phosphine sodium salt (30.1 mg, 53 $\mu$mol and lithium tetrakis(pentafluorophenyl)boron etherate (46 mg, 53 $\mu$mol). The resulting suspension was stirred and placed in a heated oil bath at 50° C. for a total of 18 hours. After 18 hours the resulting aqueous polymer slurry was poured into excess methanol (500 ml), filtered, and washed with excess methanol prior to drying to constant weight under vacuum at 80° C.

The dried, granular polymer was found to weigh 3.7 g. Proton NMR revealed the polymer to be free of any solvents or unconverted monomer. The proton NMR also indicated the product to be a random copolymer of the two monomers (54 mole % norbornene, 46 mole % methylacrylate).

EXAMPLE 6

To a thick-walled, septum-sealed 100 ml glass vial, equipped with a magnetic stir bar was added butylnorbornene (3.97 g, 26.5 mmol), toluene (25 ml) and methylacrylate (2.38 ml, 26.5 mmol). Thereafter was added tricyclohexylphosphine (14.6 mg, 53 $\mu$mol) premixed with (cyclooctadiene)palladium(methyl)chloride in toluene (3 ml) followed by lithium tetrakis(pentaflurorophenyl)boron (36 mg, 53 $\mu$mol) in toluene (3 ml). The resulting stirred solution was placed in a heated oil bath at 50° C. for a total of 24 hours. After 24 hours the polymer was precipitated by pouring the reaction mixture into excess methanol (300 ml), filtered and washed with excess methanol prior to drying to constant weight under vacuum at 80° C.

The dried, white, granular polymer was found to weigh 1.6 g. Proton NMR revealed the polymer to be free of any solvents or unconverted monomer. The proton NMR also indicated the product to be a random copolymer of the two monomers (93 mole % butylnorbornene, 17 mole % methylacrylate).

EXAMPLE 7

To a thick-walled, septum-sealed 100 ml glass vial, equipped with a magnetic stir bar was added the tert-butylester of norbomene (5.15 g, 26.5 mmol), toluene (25 ml), 2,6-di-tert-butylpyridine (50 mg, 265 $\mu$mol) (added to prevent cleavage of the ester group, and subsequent liberation of isobutylene) and methylacrylate (2.38 ml, 26.5 mmol). Thereafter was added tricyclohexylphosphine (14.6 mg, 53 $\mu$mol) premixed with (cyclooctadiene)palladium (methyl)chloride in toluene (3 ml) followed by lithium tetrakis(pentaflurorophenyl)boron (36 mg, 53 $\mu$mol) in toluene (3 ml). The resulting stirred solution was placed in a heated oil bath at 50° C. for a total of 18 hours. After 18 hours the polymer was precipitated by pouring the reaction mixture into excess methanol (200 ml), filtered, and washed with excess methanol prior to drying to constant weight under vacuum at 80° C.

The dried polymer was found to weigh 0.5 g. Proton NMR revealed the polymer to be free of any solvents or unconverted monomer. The proton NMR also indicated the product to be a random copolymer of the two monomers (86 mole % methylacrylate, 14 mole % tert-butylester of norbornene).

EXAMPLE 8

To a thick-walled, septum-sealed 100 ml glass vial, equipped with a magnetic stir bar was added ethylester of norbornene (4.4 g, 26.5 mmol), toluene (25 ml), and methylacrylate (2.38 ml, 26.5 mmol). Thereafter was added tricyclohexylphosphine (14.6 mg, 53 $\mu$mol) premixed with (allyl) palladiumchloride dimer in toluene (3 ml) followed by lithium tetrakis(pentaflurorophenyl)boron (36 mg, 53 $\mu$mol) in toluene (3 ml). The resulting stirred solution was placed in a heated oil bath at 50° C. for a total of 18 hours. After 18 hours the polymer was precipitated by pouring the reaction mixture into excess methanol (200 ml), filtered, and washed with excess methanol prior to drying to constant weight under vacuum at 80° C.

The dried polymer was found to weigh 0.4 g. Proton NMR revealed the polymer to be free of any solvents or unconverted monomer. The proton NMR also indicated the product to be a random copolymer of the two monomers (63 mole % methylacrylate, 37 mole % ethylester of norbomene).

EXAMPLE 9

To a thick-walled, septum-sealed 100 ml glass vial, equipped with a magnetic stir bar was added norbornene (2.5 g, 26.5 mmol), deionized water (25 ml), which had been purged with nitrogen for 15 minutes and methylmethacrylate (2.65 g, 26.5 mmol). Thereafter was added a largely homogeneous solution made by mixing (for 30 minutes, under nitrogen in an ultrasonicator) allylpalladium chloride dimer (9.7 mg, 53 $\mu$mol), deionized water (3 ml), tris(3-sulfonatophenyl)phosphine sodium salt (30.1 mg, 53 $\mu$mol and lithium tetrakis(pentafluorophenyl)boron (36 mg, 53 $\mu$mol). The resulting suspension was stirred and placed in a heated oil bath at 50° C. for a total of 18 hours. After 18 hours the resulting aqueous polymer slurry was poured into excess methanol (500 ml), filtered, and washed with excess methanol prior to drying to constant weight under vacuum at 80° C.

The dried, granular polymer was found to weigh 3.9 g. Proton NMR revealed the polymer to be free of any solvents or unconverted monomer. The proton NMR also indicated the product to be a random copolymer of the two monomers (71 mole % norbornene, 29 mole % methylmethacrylate).

EXAMPLE 10

To a thick-walled, septum-sealed 100 ml glass vial, equipped with a magnetic stir bar was added norbornene (2.5 g, 26.5 mmol), dichloroethane (35 ml) and methylacrylate (2.38 ml, 26.5 mmol). Thereafter was added catalyst component D (9 mg, 26 μmol) dissolved in dichloroethane (2 ml), trispentafluorophenylboron (234 μmol) and triethylaluminum (0.16 ml (1.7 molar in cyclohexane), 260 μmol). The resulting stirred solution was placed in a heated oil bath at 50° C. for a total of 48 hours. After 48 hours the polymer was precipitated by pouring the reaction mixture into excess methanol (300 ml), filtered, and washed with excess methanol prior to drying to constant weight under vacuum at 80° C.

The dried, white, granular polymer was found to weigh 0.2 g. Proton NMR revealed the polymer to be free of any solvents or unconverted monomer. The proton NMR also indicated the product to be a random copolymer of the two monomers (71 mole % norbornene, 29 mole % methylacrylate).

What is claimed is:

1. A copolymer composition comprising polycyclic and acrylic repeating units of the formulae:

wherein $R^1$ to $R^4$ independently represent a radical selected from a group consisting of —$(CH_2)_n$—$C(O)OR^5$, —$(CH_2)_n$—$OR^5$, —$(CH_2)_n$—$OC(O)R^5$, —$(CH_2)_n$, —$C(O)R^5$—$(CH_2)_n$—$OC(O)OR^5$, and —$(CH_2)_n C(O)OR^6$, wherein m represents an integer from 0 to 5, n independently represents an integer from 0 to 10; $R^5$ independently represents hydrogen, linear or branched $(C_1–C_{10})$ alkyl, linear or branched, $(C_2–C_{10})$ alkenyl, linear or branched $(C_2–C_{10})$ alkynyl, $(C_5–C_{12})$ cycloalkyl, $(C_6–C_{14})$ aryl, $(C_7–C_{24})$ aralkyl, and halogenated substituents thereof; $R^6$ represents an acid labile moiety; $R^8$ is hydrogen or methyl; or $R^9$ independently is selected from a group consisting of hydrogen, an acid labile group, linear and branched $(C_1–C_{10})$ alkyl, linear and branched, $(C_2–C_{10})$ alkenyl, linear and branched $(C_2–C_{10})$ alkynyl, $(C_5–C_{12})$ cycloalkyl, $(C_6–C_{14})$ aryl, $(C_7–C_{24})$ aralkyl; and halogenated substituents thereof.

2. The copolymer composition of claim 1 wherein a portion of said polycyclic repeating units are represented by the formula:

wherein $R^1$ to $R^3$ and n are as defined and $R^6$ is an acid labile moiety selected from the group —$C(CH_3)_3$, —$Si(CH_3)_3$, —$CH(R^7)OCH_2CH_3$, —$CH(R^7)OC(CH_3)_3$ or the following cyclic groups:

wherein $R^7$ represents hydrogen or a linear or branched $(C_1–C_5)$ alkyl.

3. The copolymer composition of claim 1 wherein a portion of said acrylate repeating units are represented by the formula:

wherein $R^8$ is as defined, $R^9$ is an acid labile moiety selected from the group —$C(CH_3)_3$, —$Si(CH_3)_3$, —$CH(R^7)OCH_2CH_3$, —$CH(R^7)OC(CH_3)_3$ or the following cyclic groups:

wherein $R^7$ represents hydrogen or a linear or branched $(C_1–C_5)$ alkyl.

4. A composition comprising a polycycloolefin monomer, a acrylate monomer, and a catalyst comprising a Group VIII metal cation and a weakly coordinating anion complex of the formula:

wherein L represents a ligand containing 1, 2, or 3 π-bonds; M represents a Group VIII transition metal; X' represents a ligand containing 1 σ-bond and between 0 to 3 π-bonds; y' is 0, 1, or 2; CA represents a weakly coordinating counteranion; and a is a number representing the number of times said counteranion is taken to balance the charge on said cation complex.

5. The composition of claim 4 wherein said polycycloolefin and acrylate monomers are selected from a monomer of the formulae:

wherein $R^1$ to $R^4$ independently represent a radical selected from —$(CH_2)_nC(O)OR^5$, —$(CH_2)_n$—$C(O)OR^5$, —$(CH_2)_n$—$OR^5$, —$(CH_2)_n$—$OC(O)R^5$, —$(CH_2)_n$—$C(O)R^5$, —$(CH_2)_n$—$OC(O)OR^5$, and —$(CH_2)_nC(O)OR^6$, wherein m represents an integer from 0 to 5, n independently represents an integer from 0 to 10; $R^5$ independently represents hydrogen, linear and branched ($C_1$–$C_{10}$) alkyl, linear and branched, ($C_2$–$C_{10}$) alkenyl, linear and branched ($C_2$–$C_{10}$) alkynyl, ($C_5$–$C_{12}$) cycloalkyl, ($C_6$–$C_{14}$) aryl, ($C_7$–$C_{24}$) aralkyl, and halogenated substituents thereof; $R^6$ represents an acid labile moiety; $R^8$ is hydrogen or methyl; and $R^9$ independently is selected from hydrogen, an acid labile moiety, linear and branched ($C_1$–$C_{10}$) alkyl, linear and branched, ($C_2$–$C_{10}$) alkenyl, linear and branched ($C_2$–$C_{10}$) alkynyl, ($C_5$–$C_{12}$) cycloalkyl, ($C_6$–$C_{14}$) aryl, ($C_7$–$C_{24}$) aralkyl; and halogenated substituents thereof.

6. The composition of claim 5 wherein said acid labile moiety in said polycycloolefin and said acrylate monomers is selected from the group —$C(CH_3)_3$, —$Si(CH_3)_3$, —$CH(R^7)OCH_2CH_3$, —$CH(R^7)OC(CH_3)_3$ or the following cyclic groups:

wherein $R^7$ represents hydrogen or a linear or branched ($C_1$–$C_5$) alkyl.

7. The composition of claim 5 wherein said Group VIII metal is selected from nickel or palladium; L is selected from the group consisting of ($C_2$–$C_{12}$) monoolefin, ($C_4$–$C_{12}$) diolefin, ($C_6$–$C_{20}$) aromatic; phosphine; phosphite; and bipyridyl ligands; X' is selected from the group consisting of ($C_1$–$C_{10}$) alkyl, p-tolyl, pentafluorophenyl, ($C_7$–$C_{15}$) aralkyl; and substituted and unsubstituted linear and cyclic ($C_3$–$C_{20}$) alkenyl.

8. The composition of claim 7 wherein X' is linear and cyclic ($C_3$–$C_{20}$) alkenyl substituted with linear and branched ($C_1$–$C_{20}$) alkoxy, ($C_6$–$C_{15}$) aryloxy, halo, and combinations thereof.

* * * * *